United States Patent
Emberger et al.

(10) Patent No.: US 10,348,633 B2
(45) Date of Patent: Jul. 9, 2019

(54) AIRCRAFT COMMUNICATION SYSTEMS AND METHODS

(71) Applicant: Airbus Operations (S.A.S.), Toulouse (FR)

(72) Inventors: Luc Emberger, Corronsac (FR); Julie Facon, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 103 days.

(21) Appl. No.: 14/955,009

(22) Filed: Nov. 30, 2015

(65) Prior Publication Data

US 2016/0182390 A1    Jun. 23, 2016

(30) Foreign Application Priority Data

Dec. 19, 2014    (FR) .................................... 14 62856

(51) Int. Cl.
| | | |
|---|---|---|
| *H04L 12/801* | (2013.01) | |
| *H04L 12/707* | (2013.01) | |
| *H04B 7/185* | (2006.01) | |
| *H04L 12/40* | (2006.01) | |

(52) U.S. Cl.
CPC ......... *H04L 47/34* (2013.01); *H04B 7/18506* (2013.01); *H04L 12/40006* (2013.01); *H04L 45/24* (2013.01); *H04L 2012/4028* (2013.01)

(58) Field of Classification Search
CPC ........ H04W 72/12; H04L 47/34; H04L 45/24; H04B 7/18506
See application file for complete search history.

(56) References Cited

U.S. PATENT DOCUMENTS

| 7,142,514 | B2 * | 11/2006 | Wang ...................... H04L 47/20 370/235 |
| 8,462,799 | B2 | 6/2013 | Molsberry et al. |
| 9,686,164 | B1 * | 6/2017 | Paczkowski ............ H04L 47/00 |
| 2010/0124196 | A1 * | 5/2010 | Bonar .................. H04B 7/0689 370/329 |
| 2013/0010622 | A1 * | 1/2013 | Horn ................... H04W 72/085 370/252 |

(Continued)

FOREIGN PATENT DOCUMENTS

| EP | 1 096 699 A2 | 5/2001 |
| EP | 2 166 677 A2 | 3/2010 |
| EP | 2 378 676 A1 | 10/2011 |

OTHER PUBLICATIONS

French Report and Written Opinion for Application No. 1462856 dated Aug. 7, 2015.

*Primary Examiner* — Michael Thier
*Assistant Examiner* — Brian P Cox
(74) *Attorney, Agent, or Firm* — Jenkins, Wilson, Taylor & Hunt, P.A.

(57) ABSTRACT

The disclosure herein proposes minimizing the processing and transmission time of an urgent message from an aircraft and relates to a communication system of an aircraft including a set of communication devices or systems intended to transmit data streams, the system including a data processing interface configured to transmit a data stream by dividing it into several data packets and by making the data packets simultaneously pass through different communication devices or systems from among the set of communication devices or systems.

5 Claims, 3 Drawing Sheets

(56) References Cited

U.S. PATENT DOCUMENTS

| | | | |
|---|---|---|---|
| 2013/0315596 A1* | 11/2013 | Rollet | H04L 12/2424 398/67 |
| 2013/0317673 A1* | 11/2013 | Leroy | G08G 5/0008 701/14 |
| 2014/0075506 A1* | 3/2014 | Davis | H04L 67/12 726/3 |
| 2015/0222351 A1* | 8/2015 | Judd | H04B 7/18506 455/11.1 |

* cited by examiner

AIRCRAFT COMMUNICATION SYSTEMS AND METHODS

CROSS-REFERENCE TO RELATED APPLICATION

This application claims the benefit of and priority to French patent application No. 14 62856 filed on Dec. 19, 2014, the entire disclosure of which is incorporated by reference herein.

TECHNICAL FIELD

The present disclosure generally relates to the communication system of an aircraft and, more particularly, to data transmission and methods.

BACKGROUND

The communication system of an aircraft usually comprises various communication devices, systems and/or structures according to several transmission technologies (for example, VHF, HF, SATCOM, WIFI, Cellular) and according to several exchange protocols of the IP, AGARS or ATN type. The exchange protocol is determined by the communication system and possibly by the type of application.

The choice of a communication devices or system at a given time is made according to a predetermined criterion based, for example, on the cost of the communications, the quality of the transmission on the preference of the airline company. Once a communication system has been selected for each type of protocol (AGARS, ATN, IP), it is then used exclusively as long as it is available for transmitting the data steams. The exchange protocol used is determined by the communication device or system itself and possibly by the type of application. Thus, the transmission of a message or of a data stream can be more or less slow as a function of the selected routing strategy.

However, in certain cases, it can be advantageous to transmit the data to the ground as fast as possible. At present the only option is to select the communication device or system offering the highest data rate. This can however prove to be inadequate with the current communication system.

Consequently, a purpose of the present disclosure is to provide an aircraft communication system and method having an architecture which makes it possible to transmit data from the aircraft at maximum speed.

SUMMARY

The disclosure herein proposes minimizing the processing and transmission time of an urgent message from the aircraft to a station on the ground by using different communication devices or systems simultaneously.

The disclosure herein relates to an aircraft communication system comprising a set of communication devices or systems intended to transmit data streams, the system comprising a data processing interface configured or designed to transmit a data stream by dividing it into several data packets and by making the data packets simultaneously pass through different communication devices or systems from among the set of communication devices or systems.

The disclosure herein also relates to a method of communication in an aircraft comprising a set of communication devices or systems intended to transmit data streams, the method comprising:

dividing a data stream to be transmitted into several data packets; and simultaneous transmission of the data packets via different communication devices or systems from among the set of communication devices or systems.

The disclosure herein also relates to a method of communication on the ground, comprising:

retrieving a set of data packets transmitted by an aircraft; and reconstructing an initial data stream by re-ordering the data packets using numbers associated with the data packets. The reconstituted data stream can thus be transmitted to the address of its final destination written for example in the header of the data stream.

The disclosure herein also relates to a set of on-board computers comprising a communication system such as defined above. "Set of computers" refers to one or more computers.

Finally, the disclosure herein relates to an aircraft, comprising a communication system such as defined above.

BRIEF DESCRIPTION OF THE DRAWINGS

Other features and advantages of the disclosure herein will become apparent on reading the preferred embodiments of the disclosure herein described with reference to the appended figures in which.

DETAILED DESCRIPTION

A principle of the disclosure herein involves simultaneously using all of the available communication devices or systems in order to reduce, by a maximum amount, the overall transmission time of a same data stream.

Figure 1:
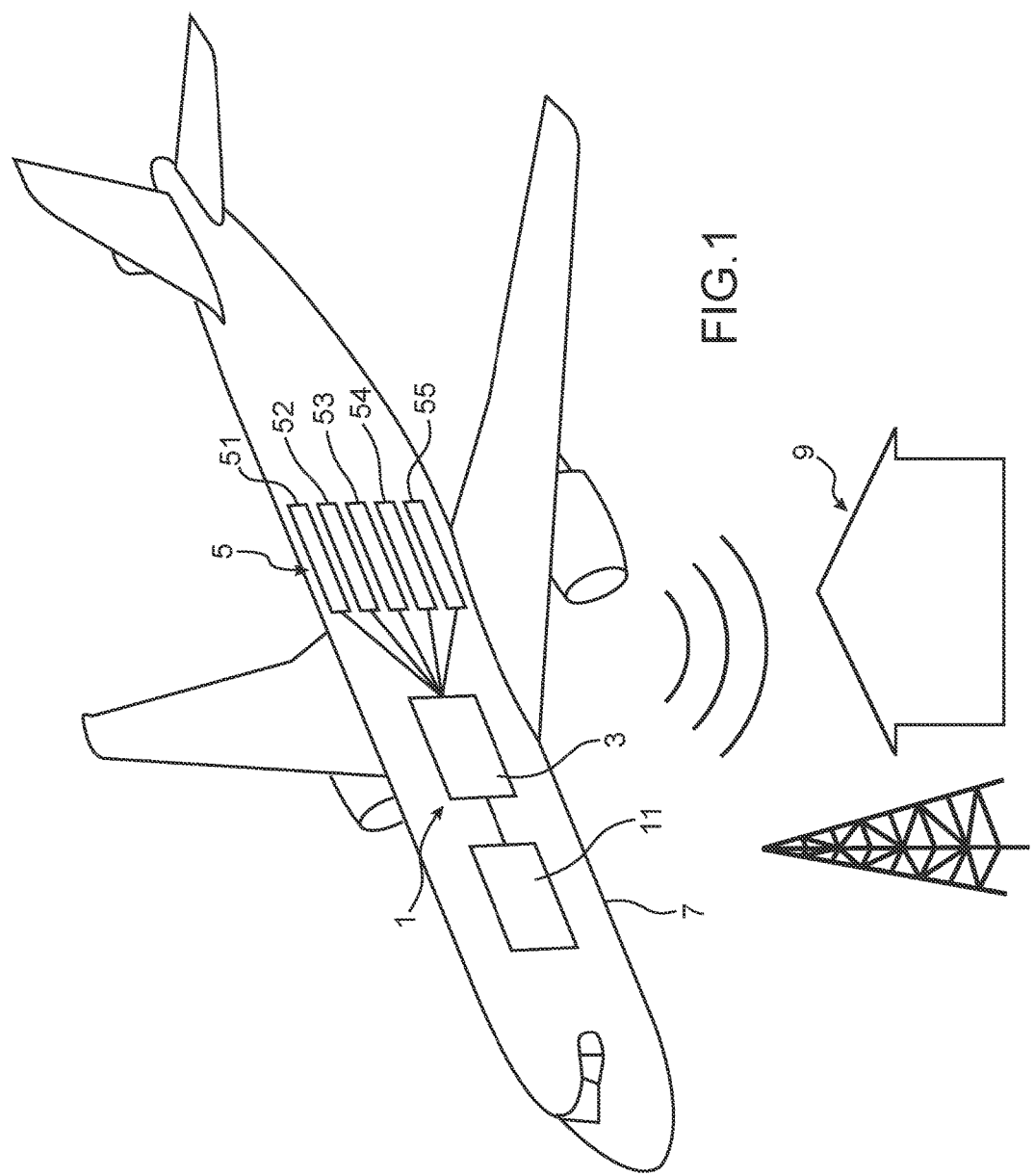
FIG. 1 shows in diagrammatic manner the architecture of an aircraft communication system according to one embodiment of the disclosure herein.

FIG. 1 is a diagrammatic representation of the architecture of an aircraft communication system according to one embodiment of the disclosure herein. The communication system is generally associated with systems monitoring the correct functioning of the aircraft or with elementary control systems managing particular functions of the aircraft.

The communication system 1 according to the disclosure herein comprises a data processing interface 3 and a set 5 of communication devices or systems (or channels) 51-55.

The communication devices or systems 51-55 are intended to transmit data streams or messages between the aircraft 7 in flight and a station 9 on the ground and possibly between different aircraft.

The set of communication devices or systems 51-55 comprises for example satellite communication devices or systems of the SATCOM type, HF (High Frequency) or VHF (Very High Frequency) broadcast, telephonic of the cellular type, or wireless of the WIFI type.

According to one embodiment of the disclosure herein, the data processing interface 3 is an access point which is configured to receive a message or a data stream from applications 11 (for example, monitoring or control systems) of the aircraft and to transmit the data stream to the ground (or possibly to other aircraft) via different communication devices or systems from among the set 5 of communication devices or systems 51-55. In fact, the processing interface 3 is configured to divide or partition the data stream into several data packets and to make these data packets simultaneously pass through the different available communication devices or systems 51-55. "Simultaneously" is understood to mean that the different packets composing a given message are transmitted in parallel and virtually at the same time over the different communication devices or systems.

The processing interface 3 is thus configured to use, at a given time, the maximum amount of communication devices or systems 51-55 in parallel in order to carry out the transmission of the data stream from on board the aircraft 7 in a minimum amount of time. In fact, in certain conditions and in particular in an emergency situation, it can prove to be useful to send data from the aircraft to the ground in the shortest possible time, whatever communication devices or systems are available.

Figure 2:
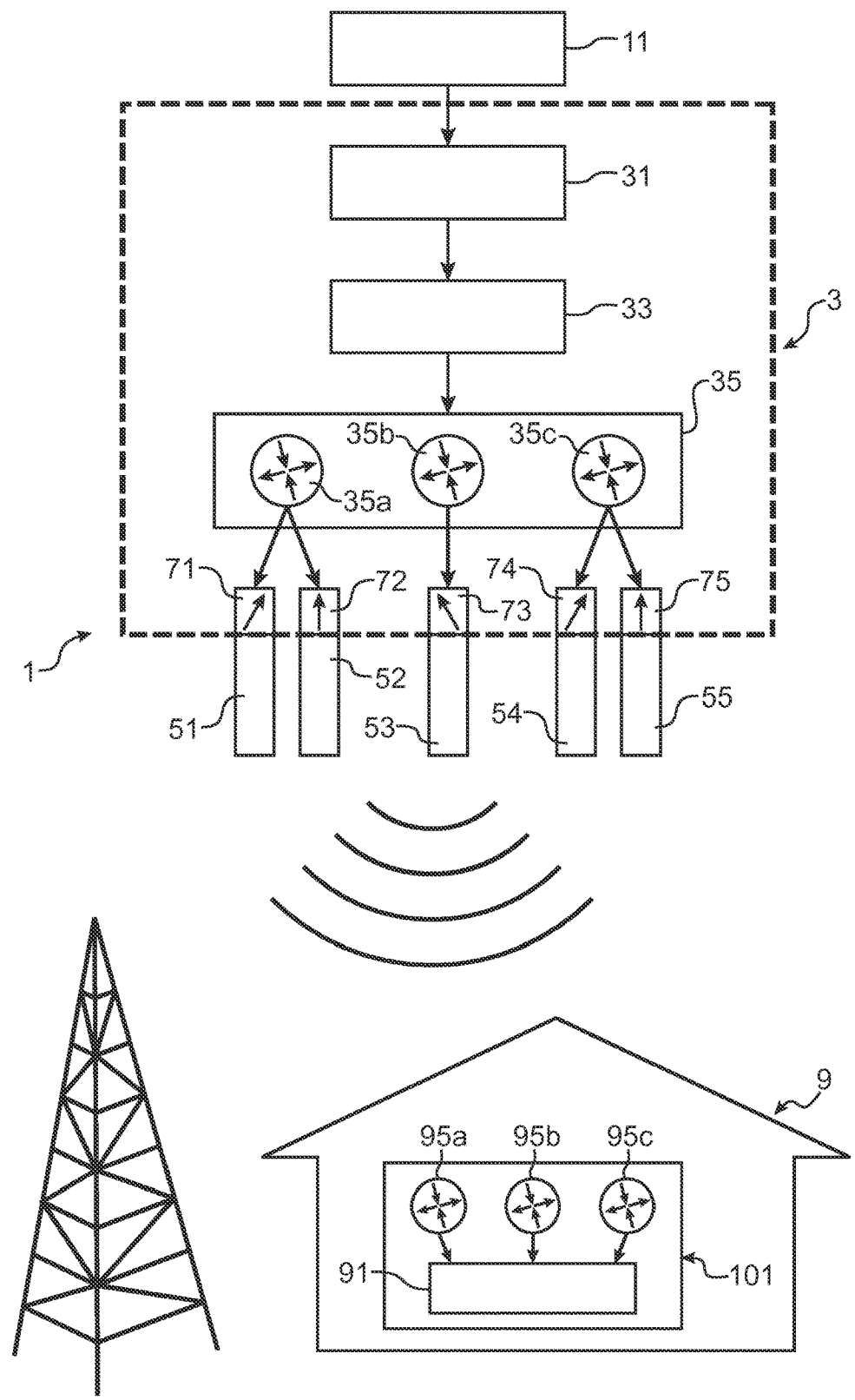
FIG. 2 shows a block diagram of an aircraft communication system according to a preferred embodiment of the disclosure herein.

FIG. 2 is a block diagram of a communication system in an aircraft according to a preferred embodiment of the disclosure herein.

It will be noted that the communication system can be comprised in one or more computers installed in an aircraft.

According to the disclosure herein, the communication system comprises a set of communication devices or systems 51-55 intended to transmit data streams and a processing interface 3 configured to partition each data stream coming from the applications 11 into several packets and making these packets simultaneously pass though at least one sub-set of the set 5 of communication devices or systems 51-55.

Thus, the processing interface 3 is an access module which interfaces between the applications 11 of the aircraft and the communication devices or systems 51-55. The processing interface 3 can correspond to hardware processing system(s) and/or to software installed in one or more computers of the aircraft.

According to this embodiment, the processing interface 3 comprises a controller 31, a selector 33 and a set 35 of routers 35*a*, 35*b*, 35*c*.

The routers 35 implement different protocols of the IP, AGARS or ATN type and are connected to the communication devices or systems 51-55. In the example shown, the communication system 1 comprises three routers 35*a*, 35*b*, 35*c*. A first router 35*a* implementing the AGARS exchange protocol is connected to two communication devices or systems 51 and 52. A second router 35*b* implementing the ATN exchange protocol is connected to a single communication device or system 53 and, finally, a third router 35*c* implementing the IP exchange protocol is connected to two communication devices or systems 54 and 55. The routers 35*a*-35*c* are thus configured to cause the data to pass though the different communication devices or systems 51-55.

The controller 31 is configured to receive a message or a data stream from the applications 11 of the aircraft. It will be noted that the data stream comprises, for example in its header, the address of the station 9 on the ground to which the data are to be sent.

Following a triggering event (for example an emergency situation), the controller 31 is configured to deactivate the initial routing strategy implemented by the routers 35*a*-35*c* in order to change into the simultaneous transmission mode. According to this mode, the controller 11 is configured to divide the data stream into several data packets whilst identifying each one of these packets. In fact, in addition to the destination address and the overall identification of the data stream, each data packet is numbered in order to allow the reconstruction of the initial data stream by reassembling the different packets according to their numbers. Moreover, the controller 31 is adapted to allocate each data packet with the address of a reconstruction module 91 in the station 9 on the ground and which is configured to reconstruct the data stream transmitted by the aircraft.

Advantageously, the controller 31 is configured to divide the data stream into data packets having sizes compatible with the different exchange protocols relative to the routers 35*a*-35*c*. Thus, each data packet can be transmitted via any of the routers without taking account of the protocol used.

According to a first variant, the controller 31 is configured to divide the data stream simply into packets having the same predetermined size.

According to a second variant, the controller 31 is configured to divide the data stream in an optimal manner into packets having sizes that vary according to the communication devices or systems 51-55 and/or the exchange protocols relative to the routers 35*a*-35*c*. This makes it possible to take into account the protocol used in order to optimize the size of the packets. For example small packets can be assigned to the router 35*a* defining the AGARS protocol whilst large packets can be assigned to the router 35*c* defining the IP protocol having a higher data rate.

Moreover, the selector 33 is a module coupled on the one hand to the controller 31 and on the other hand to the routers 35. The selector 33 is configured to establish a correspondence between the set of data packets formed by the controller 31 and the set of communication devices or systems 51-55 according to a criterion of availability and/or of data rate relative to each communication device or system. Thus, the selector 33 is configured to assign each data packet to a corresponding router (i.e. to the router connected to the communication device or system through which the data packet must pass). The selector 33 thus acts as a generic router which takes account only of the availability of the communication devices or systems 51-55. For example, if the communication device or system 54 is the most free, the selector 33 sends the current packet to the router 35*c* which will use the IP protocol.

According to a particular embodiment of the present disclosure, the criterion of availability and/or of data rate relative to each communication device or system is defined by a counter associated with the communication device or system.

Thus, the communication system comprises a set of counters 71-75 associated with the set of communication devices or systems 51-55. Each counter is configured to determine the size of a queue relative to the communication device or system with which it is associated. In other words, each of the counters 71-75 measures the number of data packets waiting for transmission by the corresponding communication device or system. The selector 33 is configured to read the value of the counter associated with each communication device or system and to increment this value when this communication device or system is selected for transmitting a new packet.

According to a variant, a significance is allocated to each counter 71-75 as a function of the data rate of the communication device or system with which it is associated. Thus, the value of the counter is determined both as a function of the size of the queue and of the data rate of the communication device or system. For example, a communication device or system having a low data rate can for example have its counter increased by a value greater than 1 in order to take account of the fact that the sending of the waiting data packets will require more time.

Thus, the selector 33 is configured to browse through the set of active communication devices or systems 51-55 and to establish the correspondence between the data packets and the different communication devices or systems as a function of the values defined by the counters 71-75 according to the queue and/or data rate criteria relative to each communication devices or systems.

According to another embodiment, the communication system 1 can be limited to a predetermined sub-set of the set 5 of communication devices or systems. It is for example possible to exclude the most expensive communication device(s) or system(s) or the communication device(s) or system(s) whose quality of service (i.e. the successful transmission data rate) is not considered to be sufficient, etc. It is also possible to impose the use of a single protocol.

Moreover, according to one or other of the embodiments, the different communication devices or systems 51-55 selected are intended to transmit the various data packets to a receiving system 101 installed in a station 9 on the ground or possibly in another aircraft.

The receiving system 101 on the ground comprises a reconstruction module 91 and receiving routers 95a-95c. These receiving routers 95a-95c are routers symmetrical with those of the communication system 1 of the aircraft and also define different exchange protocols of the IP, AGARS or ATN type. The receiving routers 95a-95c are thus intended to receive the respective data packets transmitted by the aircraft.

The reconstruction module 91 is intended to reconstruct the data stream from the different data packets by using the numbering assigned to the latter by the controller 31.

Figure 3:
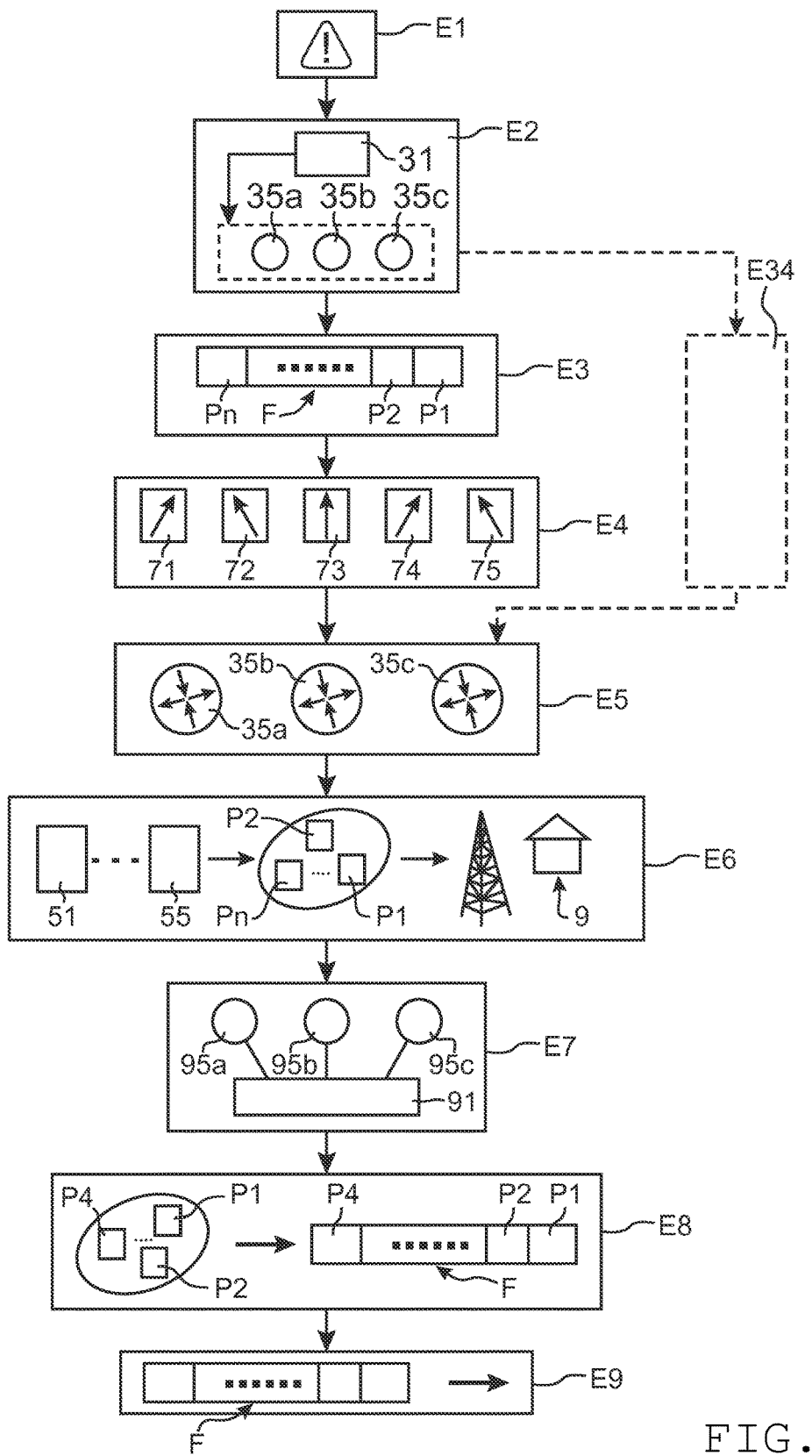
FIG. 3 is a diagrammatic representation of an aircraft communication method according to the embodiment shown in FIG. 2.

FIG. 3 is a block diagram of an aircraft communication method according to the embodiment shown in FIG. 2.

Step E1 corresponds to the occurrence of an event (for example, a state of emergency) triggering the activation of the simultaneous transmission mode in order to allow the rapid sending of data, for example to a station 9 on the ground.

In step E2, after the occurrence of the triggering event, the controller 31 acts on the routers 35 in order to deactivate the usual routing policies in progress which led to choosing a preferred communication device or system (for example a reference means of the airline company, a system having low communication cost, a system having a high quality of service, etc.).

In step E3, the controller 31 divides the data stream F received from aircraft applications into data packets P1-Pn. The controller 31 proceeds with the numbering of each packet knowing that the heterogeneity of the communication devices or systems 51-55 used can result in an unordered reception of the different packets. The controller 31 also assigns each data packet with the address of the reconstruction module 91.

In step E4, for each data packet, the selector 33 browses through the list of the active communication devices or systems 51-55 and selects the one whose counter 71-75 of packets being processed has the smallest value and then increments that counter. The data packet is then allocated to the router associated with the selected communication device(s) or system(s).

As a variant, steps E3 and E4 are replaced by a step E34 in which the data packets are divided progressively and dynamically into variable sizes as a function of the communication devices or systems and/or of the exchange protocols relative to the routers. Thus, a first packet is created after choosing a communication device or system, then a second packet (possibly of different size) is created after choosing the next communication device or system, and so on.

In step E5, the routers 35a-35c, whose routing policy is deactivated, process the packets allocated to them with the required protocols (AGARS, ATN, IP) associated with the selected communication device or system.

According to a first variant, the routers 35a-35c themselves choose the least busy communication device or system. According to a second variant, the routers use the communication device or system imposed by the selector 33.

In step E6, the different communication devices or systems 51-55 selected send the data packets to the address of the reconstruction module 91 on the ground.

In step E7 the routers 95a-95c on the ground retrieve the different respective data packets and transmit them to the reconstruction module 91.

In step E8, the reconstruction module 91 reassembles the initial data stream F by re-ordering the data packets p1, . . . , Pn using the numbers assigned to them by the controller 31.

In step E9, the reconstruction module 91 transmits the reconstituted data stream F to the address of its final destination written for example in the header of the data stream.

Thus, the communication method is not limited to a single communication device or system and uses all of the available communication device or system in parallel in order to transmit messages to the station on the ground as quickly as possible.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft communication system comprising a set of communication devices or systems to transmit different data streams, the aircraft communication system comprising a data processing interface configured to transmit, in response to a triggering event, an urgent message as a data stream by:

dividing the urgent message into a sequence of data packets;

deactivating an initial routing strategy for routing data streams to the set of communication devices or systems and changing into a simultaneous transmission mode to transmit the urgent message;

assigning each data packet of the urgent messages to a respective one of the set of communication devices or systems using a set of counters associated with the set of communication devices or systems, including incrementing the counter for each communication device or system in response to assigning a data packet to the communication device or system and allocating a significance to each counter as a function of a data rate of the communication device or system associated with the counter; and simultaneously transmitting at least a first and second data packet from the sequence of data packets by transmitting, out of sequence, the first data packet on a first communication device or system assigned to the first data packet and the second data packet on a second communication device or system assigned to the second data packet;

wherein the data processing interface comprises:

routers connected to the communication devices or systems, the routers defining different exchange protocols and being configured to make the different data streams pass through the communication devices or systems according to the initial routing strategy;

a controller configured to receive the data stream, the controller being further configured to deactivate the initial routing strategy implemented by the routers and to divide the data stream into the sequence of data packets, wherein the controller is configured to allocate each data packet of the urgent messages with an address of a reconstruction module of a ground station configured to reconstruct the data stream; and a selector connected to the controller and to the routers, the selector being configured to browse through the set of communication devices or systems and to assign the data packets to the different communication devices or systems as a function of the counters;

wherein the routers comprise at least a first router configured for routing using an internet protocol (IP) exchange protocol, at least a second router configured for routing using an aircraft communication addressing and reporting system (ACARS) exchange protocol, and at least a third router configured for routing using an aeronautical telecommunications network (ATN) exchange protocol; and wherein the controller is configured to divide the data stream into data packets having sizes compatible with the different exchange protocols relative to the routers, and wherein the selector is configured for assigning at least a first plurality of data packets each having a packet size above a threshold size to the first router using the IP exchange protocol and for assigning at least a second plurality of data packets equal to or below the threshold size to the second router using the ACARS exchange protocol.

2. An on-board computer comprising the communication system as claimed in claim 1.

3. An aircraft comprising the communication system as claimed in claim 1.

4. The system according to claim 1, wherein assigning each data packet of the urgent messages to a respective one of the set of communication devices or systems comprises selecting communication devices or systems in an order of counters associated with the communication devices or systems from lowest to highest.

5. A method of communication in an aircraft comprising a set of communication devices or systems to transmit data streams, comprising:

in response to a triggering event, determining, at a data processing interface, to transmit an urgent message as a data stream in a simultaneous transmission mode;

dividing, at the data processing interface, the urgent message to be transmitted into a sequence of data packets;

deactivating, at the data processing interface, an initial routing strategy for routing data streams to the set of communication devices or systems and changing into the simultaneous transmission mode to transmit the urgent message;

assigning, at the data processing interface, each data packing of the urgent message to a respective one of the set of communication devices or systems using a set of counters associated with the set of communication devices or systems, including incrementing the counter for each communication device or system in response to assigning a data packet to the communication device or system and allocating a significance to each counter as a function of a data rate of the communication device or system associated with the counter; and simultaneously transmitting, at the data processing interface, at least a first and second data packet from the sequence of data packets by transmitting, out of sequence, the first data packet on a first communication device or system assigned to the first data packet and the second data packet on a second communication device or system assigned to the second data packet;

wherein the data processing interface comprises:

routers connected to the communication devices or systems, the routers defining different exchange protocols and being configured to make the different data streams pass through the communication devices or systems according to the initial routing strategy;

a controller configured to receive the data stream, the controller being further configured to deactivate the initial routing strategy implemented by the routers and to divide the data stream into the sequence of data packets, wherein the controller is configured to allocate each data packed of the urgent messages with an address of a reconstruction module of a ground station configured to reconstruct the data stream; and a selector connected to the controller and to the routers, the selector being configured to browse through the set of communication devices or systems and to establish the correspondence between the data packets and the different communication devices or systems as a function of the values defined by the counters wherein the routers comprise at least a first router configured for routing using an internet protocol (IP) exchange protocol, at least a second router configured for routing using an aircraft communication addressing and reporting system (ACARS) exchange protocol, and at least a third router configured for routing using an aeronautical telecommunications network (ATN) exchange protocol; and wherein the controller is configured to divide the data stream into data packets having sizes compatible with the different exchange protocols relative to the routers, and wherein the selector is configured for assigning at least a first plurality of data packets each having a packet size above a threshold size to the first router using the IP exchange protocol and for assigning at least a second plurality of data packets equal to or below the threshold size to the second router using the ACARS exchange protocol.

* * * * *